US011417324B2

(12) United States Patent
Hughes et al.

(10) Patent No.: US 11,417,324 B2
(45) Date of Patent: *Aug. 16, 2022

(54) SELECTIVE ADAPTATION AND UTILIZATION OF NOISE REDUCTION TECHNIQUE IN INVOCATION PHRASE DETECTION

(71) Applicant: Google LLC, Mountain View, CA (US)

(72) Inventors: Christopher Hughes, Redwood City, CA (US); Yiteng Huang, Basking Ridge, NJ (US); Turaj Zakizadeh Shabestary, San Francisco, CA (US); Taylor Applebaum, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 111 days.

This patent is subject to a terminal disclaimer.

(21) Appl. No.: 16/886,139

(22) Filed: May 28, 2020

(65) Prior Publication Data
US 2020/0294496 A1    Sep. 17, 2020

Related U.S. Application Data

(63) Continuation of application No. 16/609,619, filed as application No. PCT/US2019/013479 on Jan. 14, 2019, now Pat. No. 10,706,842.
(Continued)

(51) Int. Cl.
*G10L 15/20*    (2006.01)
*G10L 15/02*    (2006.01)
(Continued)

(52) U.S. Cl.
CPC .............. *G10L 15/20* (2013.01); *G10L 15/02* (2013.01); *G10L 15/08* (2013.01); *G10L 15/22* (2013.01);
(Continued)

(58) Field of Classification Search
USPC ....... 704/226–228, 231, 233, 246, 247, 251, 704/252
See application file for complete search history.

(56) References Cited

U.S. PATENT DOCUMENTS

2014/0278389 A1* 9/2014 Zurek ..................... G10L 15/20
704/231
2014/0278394 A1   9/2014 Bastyr et al.
(Continued)

FOREIGN PATENT DOCUMENTS

JP    2003517158    5/2003
JP    2008512789    4/2008
(Continued)

OTHER PUBLICATIONS

Korean Patent Office; Notice of Allowance issue in Application No. 1020207023713; 4 pages; dated Sep. 28, 2020.
(Continued)

*Primary Examiner* — Leonard Saint Cyr
(74) *Attorney, Agent, or Firm* — Middleton Reutlinger

(57) ABSTRACT

Techniques are described for selectively adapting and/or selectively utilizing a noise reduction technique in detection of one or more features of a stream of audio data frames. For example, various techniques are directed to selectively adapting and/or utilizing a noise reduction technique in detection of an invocation phrase in a stream of audio data frames, detection of voice characteristics in a stream of audio data frames (e.g., for speaker identification), etc. Utilization of described techniques can result in more robust and/or more accurate detections of features of a stream of audio data frames in various situations, such as in environments with strong background noise. In various implementations, described techniques are implemented in combination with an automated assistant, and feature(s) detected
(Continued)

utilizing techniques described herein are utilized to adapt the functionality of the automated assistant.

15 Claims, 7 Drawing Sheets

Related U.S. Application Data

(60) Provisional application No. 62/620,885, filed on Jan. 23, 2018.

(51) Int. Cl.
| | | |
|---|---|---|
| *G10L 15/08* | (2006.01) | |
| *G10L 15/22* | (2006.01) | |
| *G10L 21/0232* | (2013.01) | |
| *G10L 25/84* | (2013.01) | |
| *G10L 21/0216* | (2013.01) | |

(52) U.S. Cl.
CPC .......... *G10L 21/0232* (2013.01); *G10L 25/84* (2013.01); *G10L 2015/025* (2013.01); *G10L 2015/088* (2013.01); *G10L 2015/223* (2013.01); *G10L 2021/02166* (2013.01)

(56) References Cited

U.S. PATENT DOCUMENTS

| | | | |
|---|---|---|---|
| 2014/0316778 A1 | 10/2014 | Venkatesha et al. | |
| 2015/0039303 A1* | 2/2015 | Lesso | G10L 15/20 704/233 |
| 2015/0039310 A1* | 2/2015 | Clark | G10L 15/063 704/244 |
| 2015/0039311 A1* | 2/2015 | Clark | G10L 25/84 704/244 |
| 2015/0099946 A1 | 4/2015 | Sahin | |
| 2015/0223731 A1 | 8/2015 | Sahin | |
| 2016/0012827 A1* | 1/2016 | Alves | H04R 3/005 381/71.1 |
| 2016/0118042 A1 | 4/2016 | Talwar et al. | |
| 2016/0189715 A1 | 6/2016 | Nishikawa | |
| 2016/0379635 A1 | 12/2016 | Page | |
| 2017/0263244 A1* | 9/2017 | Clark | G10L 15/1807 |
| 2017/0278513 A1 | 9/2017 | Li et al. | |
| 2017/0300831 A1 | 10/2017 | Gelfenbeyn et al. | |
| 2017/0358294 A1 | 12/2017 | Hatfield et al. | |
| 2018/0177450 A1 | 6/2018 | Hansen et al. | |
| 2018/0268808 A1* | 9/2018 | Song | G10L 15/28 |
| 2019/0015033 A1 | 1/2019 | Sahin | |

FOREIGN PATENT DOCUMENTS

| | | |
|---|---|---|
| JP | 2009503568 | 1/2009 |
| KR | 20100105700 | 9/2010 |
| KR | 20130043124 | 4/2013 |
| WO | 2017069556 | 4/2017 |

OTHER PUBLICATIONS

European Patent Office; Communication Under Rule 71(3) EPC issued in Application No. 20161038.3; 48 pages; dated Mar. 1, 2021.

Japanese Patent Office; Notice of Allowance issue in Application No. 2020540546; 3 pages; dated Dec. 1, 2020.

European Patent Office; Extended European Search Report issued in Application No. 20161038.3 dated Apr. 30, 2020.

European Patent Office; Intention to Grant, Application No. 19705844. 9, 45 pages, dated Nov. 13, 2019.

European Patent Office; Invitation to Pay Additional Fees, Ser. No. PCT/US2019/013479; 20 pages; dated Apr. 17, 2019.

Huang, Y. et al., "Supervised Noise Reduction for Multichannel Keyword Spotting;" 2018 IEEE International Conference on Acoustics, Speech and Signal Processing (ICASSP), pp. 5474-5478, Apr. 15, 2018.

European Patent Office; International Seach Report and Written Opinion of Ser. No. PCT/US2019/013479; 24 pages; dated Jun. 7, 2019.

Japanese Patent Office; Notice of Reasons for Rejection issued in Application No. 2021-019793, 5 pages, dated May 16, 2022.

* cited by examiner

SELECTIVE ADAPTATION AND UTILIZATION OF NOISE REDUCTION TECHNIQUE IN INVOCATION PHRASE DETECTION

BACKGROUND

Humans may engage in human-to-computer dialogs with interactive software applications referred to herein as "automated assistants" (also referred to as "digital agents," "chatbots," "interactive personal assistants," "intelligent personal assistants," "assistant applications," "conversational agents," etc.). For example, humans (which when they interact with automated assistants may be referred to as "users") may provide commands and/or requests to an automated assistant using spoken natural language input (i.e., utterances), which may in some cases be converted into text and then processed, and/or by providing textual (e.g., typed) natural language input. An automated assistant responds to a request by providing responsive user interface output, which can include audible and/or visual user interface output.

As mentioned above, many automated assistants are configured to be interacted with via spoken utterances. To preserve user privacy and/or to conserve resources, a user must often explicitly invoke an automated assistant before the automated assistant will fully process a spoken utterance. The explicit invocation of an automated assistant typically occurs in response to certain user interface input being received at a client device. The client device includes an assistant interface that provides, to a user of the client device, an interface for interfacing with the automated assistant (e.g., receives spoken and/or typed input from the user, and provides audible and/or graphical responses), and that interfaces with one or more additional components that implement the automated assistant (e.g., remote server device(s) that process user inputs and generate appropriate responses).

Some user interface inputs that can invoke an automated assistant via a client device include a hardware and/or virtual button at the client device for invoking the automated assistant (e.g., a tap of a hardware button, a selection of a graphical interface element displayed by the client device). Many automated assistants can additionally or alternatively be invoked in response to one or more spoken invocation phrases, which are also known as "hot words/phrases" or "trigger words/phrases". For example, a spoken invocation phrase such as "Hey Assistant," "OK Assistant", and/or "Assistant" can be spoken to invoke an automated assistant.

Often, a client device that includes an assistant interface includes one or more locally stored models that the client device utilizes to monitor for an occurrence of a spoken invocation phrase. Such a client device can locally process received audio data utilizing the locally stored model, and discards any audio data that does not include the spoken invocation phrase. However, when local processing of received audio data indicates an occurrence of a spoken invocation phrase, the client device will then cause that audio data and/or following audio data to be further processed by the automated assistant. For instance, if a spoken invocation phrase is "Hey, Assistant", and a user speaks "Hey, Assistant, what time is it", audio data corresponding to "what time is it" can be processed by an automated assistant based on detection of "Hey, Assistant", and utilized to provide an automated assistant response of the current time. If, on the other hand, the user simply speaks "what time is it" (without first speaking an invocation phrase), no response from the automated assistant will be provided as a result of "what time is it" not being preceded by an invocation phrase.

Although models exist for monitoring for occurrence of a spoken invocation phrase, many such models suffer from one or more drawbacks. For example, some models may perform poorly in environments with strong background noise (e.g., noise from a television, from playing music, from other conversations). For instance, some models may lack desired robustness and/or accuracy in the presence of background noise. This can lead to a failure to detect an actually spoken invocation phrase and/or can lead to errant detection of an invocation phrase.

SUMMARY

Techniques are described herein for selectively adapting and/or selectively utilizing a noise reduction technique in detection of one or more features of a stream of audio data frames. For example, various techniques are directed to selectively adapting and/or utilizing a noise reduction technique in detection of an invocation phrase in a stream of audio data frames, detection of voice characteristics in a stream of audio data frames (e.g., for speaker identification), etc. Utilization of techniques described herein can result in more robust and/or more accurate detections of features of a stream of audio data frames in various situations, such as in environments with strong background noise. In various implementations, techniques described herein are implemented in combination with an automated assistant, and feature(s) detected utilizing techniques described herein are utilized to adapt the functionality of the automated assistant. For example, when techniques are utilized to detect presence of an invocation phrase in a stream of audio data frames, at least one function of the automated assistant can be activated in response to detecting a spoken invocation phrase, such as a function that causes one or more subsequently received audio data frames to be transmitted to one or more remote automated assistant servers for further processing. Also, for example, when techniques are utilized to detect voice characteristics in a stream of audio data frames (e.g., for speaker identification), content generated by the automated assistant can be adapted based on a speaker identified using the detected voice characteristics.

In various implementations, audio data frames that are based on output from one or more microphones of a client device are processed using a trained machine learning model to generate respective output. The generated output for each audio data frame indicates whether the audio data frame has one or more target features (e.g., target phonemes), and is used to tag the audio data frame with a corresponding output indication. As a working example, the generated output for each audio data frame can indicate a corresponding probability of each of a plurality of trigger phonemes, and optionally a corresponding probability for "no trigger phonemes". Continuing with the working example, the output indication for each audio data frame can be a "trigger" indication if the output indicates at least a first "high" threshold probability for any one of the trigger phonemes; can be a "near-trigger" indication if the output fails to indicate at least the first threshold probability for any of the trigger phonemes, but indicates a probability, for any one of the trigger phonemes, that is less than the first threshold probability, but greater than a second "low" threshold probability; and can be a "noise" indication if the output indicates less than the second threshold probability for all of the trigger phonemes (and/or indicates greater than a third threshold probability for "no trigger phonemes").

In some of those various implementations, the audio data frames and their corresponding output indications can be stored in a first in, first out (FIFO) buffer, and the contents of the buffer can be periodically (or at other regular and/or non-regular interval) assessed to determine further processing to perform based on the contents of the buffer. Continuing with the working example, if the audio data frames of the buffer at a given instance all have output indications indicative of "noise", at least one of the audio data frames of the buffer can be utilized to adapt a noise reduction technique. For example, an audio data frame that includes at least a first channel (based on a first microphone) and a second channel (based on a second microphone) can be "popped" from the buffer and utilized to adapt an adaptive noise cancellation filter (or adapt another noise reduction technique, such as beamforming). If the audio data frames of the buffer at a given instance include no output indications indicative of a "trigger", but include at least one output indication indicative of a "near trigger", the entire buffer can be flushed and the audio data frames processed using the noise reduction technique, as most recently adapted, to generate filtered data frames. The filtered data frames can then be processed using an additional trained machine learning model to determine whether an invocation phrase is present in the filtered audio data frames. The additional machine learning model can be the same as (but optionally a separate instance of) the machine learning model utilized to determine the output indications, or can optionally be a separate model such as a more robust model that may be more computationally intensive to utilize. If the audio data frames of the buffer at a given instance include at least one output indication indicative of a "trigger", the entire buffer can be flushed and the audio data frames of the buffer processed using an additional trained machine learning model to determine whether an invocation phrase is present in the additional machine learning model. In some implementations, the audio data frames of the buffer when a trigger output indication is present can additionally or alternatively be processed using the adaptive noise reduction technique, as most recently adapted, to generate filtered data frames—and such frames processed using the additional trained machine learning model to determine whether an invocation phrase is present.

In these and other manners, the noise reduction technique can be adapted based on audio data frames of a buffer, when the buffer is determined to contain only audio data frames that are all tagged with an output indication that indicates the audio data frames lack target feature(s) (e.g., lack any invocation phoneme). As mentioned above, the output indications of the audio data frames are generated based on processing of the audio data frames using an initial trained machine learning model trained to predict whether the target feature(s) are present. On the other hand, whenever it is determined the buffer contains audio data frame(s) that "potentially" include one or more of the target feature(s), the audio data frames of the buffer can be processed using the most recently adapted noise reduction technique to generate filtered data frames, and such filtered data frames processed to determine whether the target feature(s) are present. In such a situation, the audio data frames can be processed using the currently adapted noise reduction technique, but will optionally not be utilized in further adapting the noise reduction technique. The noise reduction technique may not be further adapted in such a situation since the audio data frames potentially include the target feature(s), and further adapting it based on audio data frames that include the target feature(s) can undesirably cause the target feature(s) to be filtered by the noise reduction technique. As described above, whenever it is determined the buffer contains audio data frame(s) that "likely" include one or more of the target feature(s), the audio data frames can be processed to determine whether the target feature(s) are present (optionally without filtering based on the adapted filter technique).

In addition, some implementations include one or more processors of one or more computing devices, where the one or more processors are operable to execute instructions stored in associated memory, and where the instructions are configured to cause performance of any of the methods described herein. Some implementations also include one or more transitory or non-transitory computer readable storage media storing computer instructions executable by one or more processors to perform any of the methods described herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
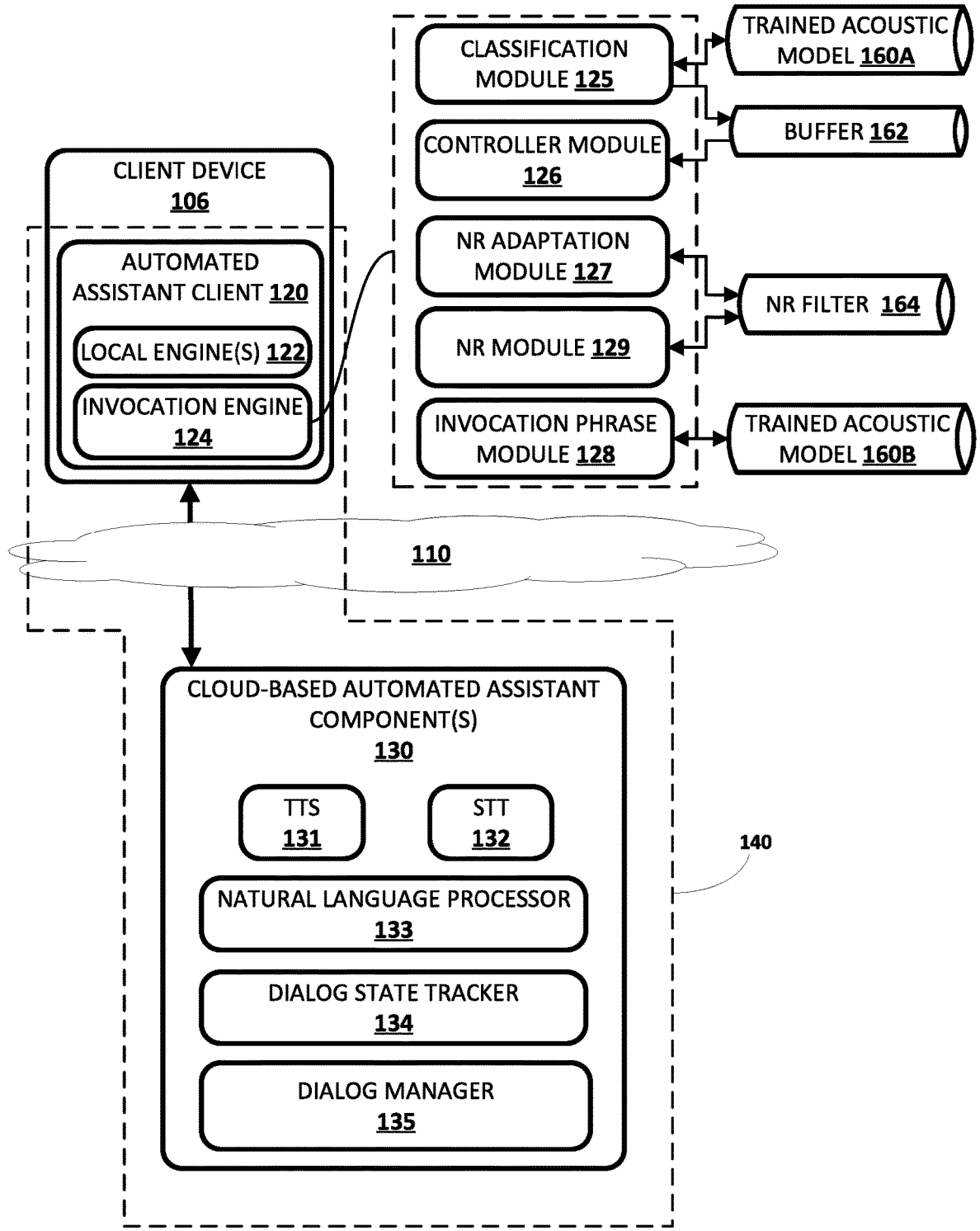
FIG. 1 is a block diagram of an example environment in which implementations disclosed herein may be implemented.

Now turning to FIG. 1, an example environment in which techniques disclosed herein may be implemented is illustrated. The example environment includes a client computing device 106 (which is also referred to simply as a "client device" in the present disclosure), which executes an instance of an automated assistant client 120. One or more cloud-based automated assistant components 130, such as a natural language processor 133, may be implemented on one or more computing systems (collectively referred to as a "cloud" computing system) that are communicatively coupled to client devices 106 via one or more local and/or wide area networks (e.g., the Internet) indicated generally at 110.

An instance of an automated assistant client 120, by way of its interactions with one or more cloud-based automated assistant components 130, may form what appears to be, from the user's perspective, a logical instance of an automated assistant 140 with which the user may engage in a human-to-computer dialog. An instance of such an automated assistant 140 is depicted in FIG. 1. It thus should be understood that in some implementations, a user that engages with an automated assistant client 120 executing on client device 106 may, in effect, engage with his or her own logical instance of an automated assistant 140. For the sakes of brevity and simplicity, the term "automated assistant" as used herein as "serving" a particular user will often refer to the combination of an automated assistant client 120 executing on a client device 106 operated by the user and one or more cloud-based automated assistant components 130 (which may be shared amongst multiple automated assistant clients of multiple client computing devices). It should also be understood that in some implementations, automated assistant 140 may respond to a request from any user regardless of whether the user is actually "served" by that particular instance of automated assistant 140.

The client computing device 106 may be, for example: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker, a smart appliance such as a smart television, and/or a wearable apparatus of the user that includes a computing device (e.g., a watch of the user having a computing device, glasses of the user having a computing device, a virtual or augmented reality computing device). Additional and/or alternative client computing devices may be provided. In various implementations, the client computing device 106 may optionally operate one or more other applications that are in addition to automated assistant client 120, such as a message exchange client (e.g., SMS, MMS, online chat), a browser, and so forth. In some of those various implementations, one or more of the other applications can optionally interface (e.g., via an application programming interface) with the automated assistant client 120, or include their own instance of an automated assistant application (that may also interface with the cloud-based automated assistant component(s) 130).

Automated assistant 140 engages in human-to-computer dialog sessions with a user via user interface input and output devices of the client device 106. As mentioned above, to preserve user privacy and/or to conserve resources, in many situations a user must often explicitly invoke the automated assistant 140 before the automated assistant will fully process a spoken utterance. The explicit invocation of the automated assistant 140 can occur in response to certain user interface input received at the client device 106. For example, user interface inputs that can invoke the automated assistant 140 via the client device 106 can optionally include actuations of a hardware and/or virtual button of the client device 106. Client device 106 includes an invocation engine 124 that is optionally operable to recognize such non-spoken inputs.

Moreover, invocation engine 124 is further operable to detect the presence of one or more spoken invocation phrases, and invoke the automated assistant 140 in response to detection of one of the spoken invocation phrases. For example, the invocation engine 124 can invoke the automated assistant 140 in response to detecting a spoken invocation phrase such as "Hey Assistant," "OK Assistant", and/or "Assistant". The invocation engine 124 can continuously process (e.g., if not in an "inactive" mode) a stream of audio data frames that are based on output from one or more microphones of the client device 106, to monitor for an occurrence of a spoken invocation phrase. While monitoring for the occurrence of the spoken invocation phrase, the invocation engine 124 discards (e.g., after temporary storage in a buffer) any audio data frames that do not include the spoken invocation phrase. However, when the invocation engine 124 detects an occurrence of a spoken invocation phrase in processed audio data frames, the invocation engine 124 can invoke the automated assistant 140.

As used herein, "invoking" the automated assistant 140 can include causing one or more previously inactive functions of the automated assistant 140 to be activated. For example, invoking the automated assistant 140 can include causing one or more local engines 122 and/or cloud-based automated assistant components 130 to further process audio data frames based on which the invocation phrase was detected, and/or one or more following audio data frames (whereas prior to invoking no further processing of audio data frames was occurring).

The one or more local engine(s) 122 of automated assistant 140 are optional, and can include, for example, a local speech-to-text ("STT") engine (that converts captured audio to text), a local text-to-speech ("TTS") engine (that converts text to speech), a local natural language processor (that determines semantic meaning of audio and/or text converted from audio), and/or other local components. Because the client device 106 is relatively constrained in terms of computing resources (e.g., processor cycles, memory, battery, etc.), the local engines 122 may have limited functionality relative to any counterparts that are included in cloud-based automated assistant components 130.

Cloud-based automated assistant components 130 leverage the virtually limitless resources of the cloud to perform more robust and/or more accurate processing of audio data, and/or other user interface input, relative to any counterparts of the local engine(s) 122. Again, in various implementations, the client device 106 can provide audio data and/or other data to the cloud-based automated assistant components 130 in response to the invocation engine 124 detecting a spoken invocation phrase, or detecting some other explicit invocation of the automated assistant 140.

The illustrated cloud-based automated assistant components 130 include a cloud-based TTS module 131, a cloud-based STT module 132, a natural language processor 133, a dialog state tracker 134, and a dialog manager 135. In some implementations, one or more of the engines and/or modules of automated assistant 140 may be omitted, combined, and/or implemented in a component that is separate from automated assistant 140. Further, in some implementations automated assistant 140 can include additional and/or alternative engines and/or modules.

Cloud-based STT module 132 can convert audio data into text, which may then be provided to natural language processor 133. Cloud-based TTS module 132 can convert textual data (e.g., natural language responses formulated by automated assistant 140) into computer-generated speech output. In some implementations, TTS module 132 may provide the computer-generated speech output to client device 106 to be output directly, e.g., using one or more speakers. In other implementations, textual data (e.g., natural language responses) generated by automated assistant 120 may be provided to one of the local engine(s) 122, which may then convert the textual data into computer-generated speech that is output locally.

Natural language processor 133 (alternatively referred to as a "natural language understanding engine") of automated assistant 140 processes free form natural language input and generates, based on the natural language input, annotated output for use by one or more other components of the automated assistant 140. For example, the natural language processor 133 can process natural language free-form input that is textual input that is a conversion, by STT module 132, of audio data provided by a user via client device 106. The generated annotated output may include one or more annotations of the natural language input and optionally one or more (e.g., all) of the terms of the natural language input.

In some implementations, the natural language processor 133 is configured to identify and annotate various types of grammatical information in natural language input. For example, the natural language processor 133 may include a part of speech tagger (not depicted) configured to annotate terms with their grammatical roles. Also, for example, in some implementations the natural language processor 133 may additionally and/or alternatively include a dependency parser (not depicted) configured to determine syntactic relationships between terms in natural language input.

In some implementations, the natural language processor 133 may additionally and/or alternatively include an entity tagger (not depicted) configured to annotate entity references in one or more segments such as references to people (including, for instance, literary characters, celebrities, public figures, etc.), organizations, locations (real and imaginary), and so forth. The entity tagger of the natural language processor 133 may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity.

In some implementations, the natural language processor 133 may additionally and/or alternatively include a coreference resolver (not depicted) configured to group, or "cluster," references to the same entity based on one or more contextual cues. For example, the coreference resolver may be utilized to resolve the term "there" to "Hypothetical Café" in the natural language input "I liked Hypothetical Café last time we ate there."

In some implementations, one or more components of the natural language processor 133 may rely on annotations from one or more other components of the natural language processor 133. For example, in some implementations the named entity tagger may rely on annotations from the coreference resolver and/or dependency parser in annotating all mentions to a particular entity. Also, for example, in some implementations the coreference resolver may rely on annotations from the dependency parser in clustering references to the same entity. In some implementations, in processing a particular natural language input, one or more components of the natural language processor 133 may use related prior input and/or other related data outside of the particular natural language input to determine one or more annotations.

In some implementations, dialog state tracker 134 may be configured to keep track of a "dialog state" that includes, for instance, a belief state of a one or more users' goals (or "intents") over the course of a human-to-computer dialog session and/or across multiple dialog sessions. In determining a dialog state, some dialog state trackers may seek to determine, based on user and system utterances in a dialog session, the most likely value(s) for slot(s) that are instantiated in the dialog. Some techniques utilize a fixed ontology that defines a set of slots and the set of values associated with those slots. Some techniques additionally or alternatively may be tailored to individual slots and/or domains. For example, some techniques may require training a model for each slot type in each domain.

Dialog manager 135 may be configured to map a current dialog state, e.g., provided by dialog state tracker 134, to one or more "responsive actions" of a plurality of candidate responsive actions that are then performed by automated assistant 140. Responsive actions may come in a variety of forms, depending on the current dialog state. For example, initial and midstream dialog states that correspond to turns of a dialog session that occur prior to a last turn (e.g., when the ultimate user-desired task is performed) may be mapped to various responsive actions that include automated assistant 140 outputting additional natural language dialog. This responsive dialog may include, for instance, requests that the user provide parameters for some action (i.e., fill slots) that dialog state tracker 134 believes the user intends to perform. In some implementations, responsive actions may include actions such as "request" (e.g., seek parameters for slot filling), "offer" (e.g., suggest an action or course of action for the user), "select," "inform" (e.g., provide the user with requested information), "no match" (e.g., notify the user that the user's last input is not understood), a command to a peripheral device (e.g., to turn off a light bulb), and so forth.

As mentioned above, invocation engine 124 is operable to detect the presence of one or more spoken invocation phrases in audio data, and invoke the automated assistant 140 in response to detection of one of the spoken invocation phrases. Invocation engine 124 can selectively adapt and utilize a noise reduction technique in detection of a spoken invocation phrase in a stream of audio data frames. As illustrated in FIG. 1, invocation engine 124 can include a classification module 125, a controller module 126, a noise reduction (NR) adaptation module 127, and an invocation phrase module 128.

The classification module 125 processes each of the audio data frames, of a stream of audio data frames, using trained acoustic model 160A. The stream of audio data frames are based on output from one or more microphones of the client device 106. For example, each of the audio data frames can have at least a first channel that is based on output from a first microphone and a second channel that is based on output from a second microphone. Processing of each of the audio data frames using the trained acoustic model 160A generates respective output, such as output that indicates, for each of one or more invocation phonemes, a corresponding probability that the phoneme is present in the audio data frame.

As used herein, the term "audio data frame" refers to a unit of audio data. For example, an audio data frame may be a single audio sample captured by a single microphone at a single point in time, a plurality of audio samples captured by a corresponding plurality of microphones at the same single point in time, a plurality of audio samples captured by a single microphone during a period of time, or a plurality of audio samples captured by a plurality of microphones during a common period of time. As used herein, an "invocation phoneme" refers to a unit of sound (e.g., a spoken utterance, or a portion thereof) that is part of an invocation phrase for an automated assistant. The invocation phrase may comprise one or more invocation phonemes. The trained acoustic model 160A may be trained using a machine learning technique; accordingly, the terms "acoustic model", "trained acoustic model", "machine learning model" and "trained machine learning model" are used interchangeably throughout the present specification.

The classification module 125 further stores the audio data frames in a buffer 162, along with corresponding output indications that are based on the corresponding output generated based on processing of the audio data frames. For example, each of the output indications can indicate one of "noise", "near-trigger", and "trigger". For instance, the classification module 125 can assign, to an audio data frame, a "noise" output indication when output for the audio data frame, generated using trained acoustic model 160A, fails to indicate at least a first "low" threshold probability for any of the invocation phonemes. Also, for instance, the classification module 125 can assign, to another audio data frame, a "near-trigger" output indication when output for the audio data frame, generated using trained acoustic model 160A, indicates at least the first threshold probability for one or more of the invocation phonemes, but fails to indicate at least a second "high" threshold probability for any of the invocation phonemes. Also, for instance, the classification module 125 can assign yet another audio data frame a "trigger" output indication when output for the audio data frame, generated using trained acoustic model 160A, indicates at least the second threshold probability for any of the invocation phonemes.

Accordingly, the classification module 125 can continuously process audio data frames of a stream, using the trained acoustic model 160A, and store them in the buffer 162 along with corresponding output indications that are based on the processing using the trained acoustic model 160A. The buffer 162 can be a first in, first out buffer of a fixed length. Accordingly, at any given time the buffer 162 can include one or more most recently processed audio data frames. A data frame can be flushed from the buffer 162 if the buffer 162 is full and a new data frame is added. Further, one or more data frames can be flushed from the buffer 162 by the controller module 126 in various situations, as described in more detail below. The fixed length of the buffer 162 can be a length that enables a desired duration of audio data to be stored in the buffer 162. The desired duration can be based on an expected duration of invocation phrase(s) (e.g., long enough to enable the full invocation phrase to be captured collectively by the audio data frames in the buffer). However, in many implementations the desired duration should not extend significantly beyond the anticipated duration, so as to not lessen the impact of the adaptive noise reduction techniques described herein. In some implementations, the desired duration is a value between 1 second and 2 seconds, such as a value between 1.25 seconds and 2.0 seconds (e.g., 1.5 seconds).

In some implementations, the trained acoustic model 160A is a convolutional neural network (CNN) model. In some of those and/or other implementations, each audio data frame includes multiple channels, and only one of the channels is processed using the trained acoustic model 160A (but both channels are stored in the buffer 162 and used by, for example, NR adaptation module 127 and/or NR module 129). Each audio data frame of the stream of audio data frames can be generated based on segmentation of signal(s) from microphone(s). For example, each audio data frame can be a 25 millisecond frame, with a 10 millisecond hop. In some implementations where the trained acoustic model 160A is a CNN, the CNN model can include five layers, with three hidden layers between the input and output layers. In some of those implementations, in processing a channel of an audio data frame using the trained acoustic model 160A, the classification module 125 computes 40-channel log-mel-filter-bank energies for the channel, and normalizes them using per-channel energy normalization (PCEN). The input applied to the input layer of trained acoustic model 160A can include stacked feature vectors, with 24 left and 15 right context frames. A convolutional layer can sit on top of the input layer and used to sweep 308 non-overlapping 8×8 patches across time and frequency. That convolutional layer can be followed by a linear projection layer with 32 outputs and a fully connected rectified linear unit (ReLU) layer with 128 outputs. The neurons in the output layer can use, for example, a softmax activation function. The output generated over the output layer can include a posterior probability for each of a plurality of target phonemes, and optionally include a single additional output representing a posterior probability for no target phonemes.

The controller module 126 periodically (or at other regular and/or non-regular interval) assesses the buffer 162 and selects an action to be performed at a given instance, using one or more audio data frames of the buffer at the given instance. The controller module 126 selects the action to be performed at the given instance based on the output indications stored in association with the audio data frames of the buffer 162. In some implementations, when the audio data frames of the buffer 162 at a given instance all have output indications indicative of "noise", the controller module 126 pops an audio data frame from the buffer and provides the popped audio data frame to NR adaptation module 127 for adaptation of the NR filter 164 based on the popped audio data frame. In some implementations, when the audio data frames of the buffer 162 at a given instance include no output indications indicative of a "trigger", but include at least one output indication indicative of a "near-trigger", the controller module 126 flushes all audio data frames from the buffer 162, and provides the flushed audio data frames to the NR adaptation module 129 for filtering of the flushed audio data frames to generate filtered data frames. The filtered data frames can then be processed by the invocation phrase module 128, using the trained acoustic model 160B, to determine whether an invocation phrase is present in the filtered audio data frames. If the audio data frames of the buffer at a given instance include at least one output indication indicative of a "trigger", the controller module 126 flushes all audio data frames from the buffer 162 and provides the flushed audio data frames to the invocation phrase module 128. The flushed audio data frames can then be processed by the invocation phrase module 128, using the trained acoustic model 160B, to determine whether an invocation phrase is present in the filtered audio data frames.

The NR adaptation module 127 dynamically adapts a noise reduction technique based on audio data frames that are popped from the buffer 162 when the buffer 162 includes only "noise" audio data frames. In some implementations, the NR adaptation module 127 adapts the noise reduction technique through adaptation of a NR filer 164. For example, in some implementations the noise reduction technique is adaptive noise cancellation (ANC), and the NR filter 164 is an ANC filter. In some of those implementations, the audio data frames provided to the NR adaptation module 127 include multiple channels and, in adapting the NR filter 164, the NR adaptation module 127 convolves the NR filter 164 with a first channel and subtracts the result from a second channel to form an error signal. The NR adaptation module 127 then adjusts filter coefficients of the NR filter 164 to minimize the mean square power of the error signal. The NR adaptation module 127 can optionally further provide the error signal, as a filtered audio data frame, to the invocation phrase module 128 for further processing using the trained acoustic model 160B (e.g., to determine whether it includes invocation phoneme(s)).

When ANC is utilized, various adaptive algorithms can be utilized to implement the ANC. As one non-limiting example, a short-time Fourier transform (STFT) based recursive least squares (RLS) technique can be utilized.

Such a technique can be flexible and/or computationally efficient. It is noted that, while ANC is described above as one example noise reduction technique, other techniques can be utilized and can optionally utilize one or more corresponding filters. One non-limiting example is a beamforming noise reduction technique.

One particular example of using a STFT based RLS technique is now provided, where the audio data frames include a first channel and a second channel, from respective first and second microphones. In such an example, at audio data frame m and for radian frequency ω, the STFT coefficients of the two microphone signals are denoted as $X_1(j\omega, m)$ and $X_2(j\omega, m)$, respectively, where $j \triangleq \sqrt{-1}$. The ANC filters the second microphone signal with a complex finite impulse response (FIR) filter of L taps:

$$h(j\omega,m) \triangleq [H_0(j\omega,m) H_1(j\omega,m) \ldots H_{L-1}(j\omega,m)]^T, \quad (1)$$

where $(\cdot)^T$ denotes the transpose of a vector or a matrix. The result is subtracted from the first microphone signal to get the error signal:

$$\varepsilon(j\omega,m) \triangleq X_1(j\omega,m) - h^H(j\omega,m) x_2(j\omega,m), \quad (2)$$

where $(\cdot)^H$ is the Hermitian transpose of a vector or a matrix and $$x_2(j\omega,m) \triangleq$$

$$[X_2(j\omega,m) X_2(j\omega,m-1) \ldots X_2(j\omega,m-L+1)]^T,$$

is the collection of the STFT coefficients of the second channel in the current and the last L−1 frames. The weighted least squares cost function is expressed as:

$$J\{h(j\omega,m)\} \triangleq \Sigma_{i=0}^{m} \lambda^{m-i} |\varepsilon(j\omega,i)|^2, \quad (3)$$

where $0<\lambda \leq 1$ is the forgetting factor. The cost function is minimized by taking the partial derivatives of equation (3) with respect to $h^H(j\omega, m)$ and setting the result to zero $$\frac{\partial J}{\partial h^H(j\omega, m)} = R_{x2x2}(j\omega, m) h(j\omega, m) - r_{x2x1}(j\omega, m) = 0 \quad (4)$$

where $$R_{x2x2}(j\omega,m) \triangleq \Sigma_{i=0}^{m} \lambda^{m-i} x_2(j\omega,i) x_2^H(j\omega,i),$$

$$r_{x2x1}(j\omega,m) \triangleq \Sigma_{i=0}^{m} \lambda^{m-i} x_2(j\omega,i) X_1^*(j\omega,i),$$

and $(\cdot)^*$ is conjugate of a complex variable. Solving equation (4) for h(jω, m) yields the RLS solution:

$$h_{RLS}(j\omega,m) = R_{x2x2}^{-1}(j\omega,m) r_{x2x1}(j\omega,m). \quad (5)$$

Using Woodbury's identity, direct computation of the matrix inversion in (5) can be avoided and a computationally more efficient version is deduced.

The NR module 129 processes audio data frames, using a noise reduction technique as most recently adapted, to generate filtered audio data frames. For example, the NR module 129 can receive audio data frames from the buffer 162 when the buffer 162 includes "near-trigger" audio data frames, but no "trigger" audio data frames. Further, the NR module 129 can process those audio data frames using the NR filter 164, as most recently adapted by the NR adaptation module 127, to generate filtered audio data frames. For instance, the audio data frames provided to the NR module 129 can include multiple channels, and in generating a filtered data frame based on one of those audio data frames, the NR module 129 can convolve the NR filter 164 with a first channel, subtract the result from a second channel to form an error signal, and use the error signal as the filtered data frame. The NR module 129 provides the filtered audio data frames to the invocation phrase module 128 for further processing using the trained acoustic model 160B.

The invocation phrase module 128 processes received audio data frames, or filtered data frames, using the trained acoustic model 160B to determine whether an invocation phrase is present. In some implementations, the trained acoustic model 160B can be the same as the trained acoustic model 160A, but can be a different instance thereof to enable parallel processing by the classification module 125 and the invocation phrase module 128. In some other implementations, the trained acoustic model 160B can be different from the trained acoustic model 160A. For example, the trained acoustic model 160B can be a more robust model that may be more computationally intensive to utilize, relative to the trained acoustic model 160A.

The invocation phrase module 128 can determine whether the invocation phrase is present based on output(s) generated based on processing using the trained acoustic model 160B. For example, when all audio data frames of the buffer 162 are flushed from the buffer, and NR module 129 generates filtered data frames that correspond to those audio data frames, the invocation phrase module 128 can determine whether an invocation phrase is present based on outputs generated by processing of those filtered data frames using the trained acoustic model 160B. For example, the invocation phrase module 128 can determine an invocation phrase is present if at least a threshold quantity of invocation phonemes, of the invocation phrase, are indicated with at least a threshold probability in the outputs (and optionally indicated in a particular order). In some implementations, in determining whether an invocation phrase is present, the invocation phrase module 128 can optionally additionally utilize output that is generated, for corresponding audio data frames, using the trained acoustic model 160A. In other words, outputs generated over trained acoustic model 160A can be considered along with outputs generated over trained acoustic model 160B for the corresponding audio data frames (or filtered variants thereof).

Figure 2A:
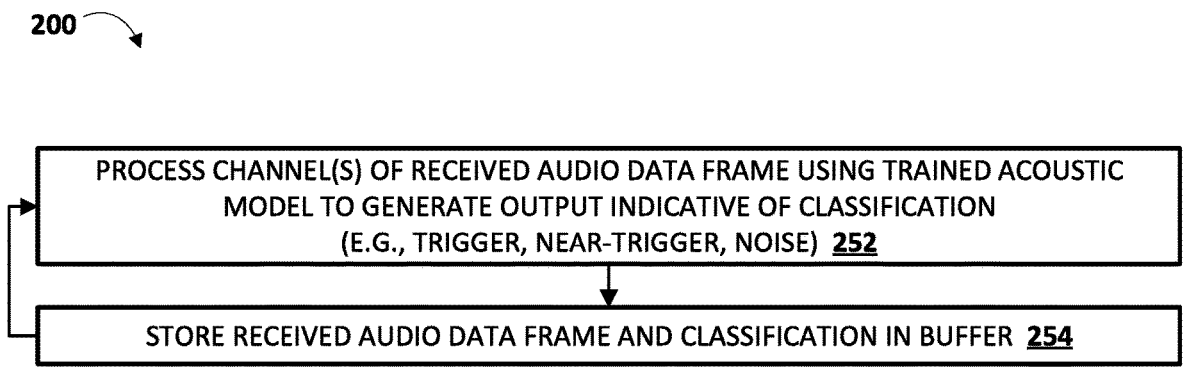
FIGS. 2A and 2B depict a flowchart illustrating an example method according to various implementations disclosed herein.
Figure 2B:
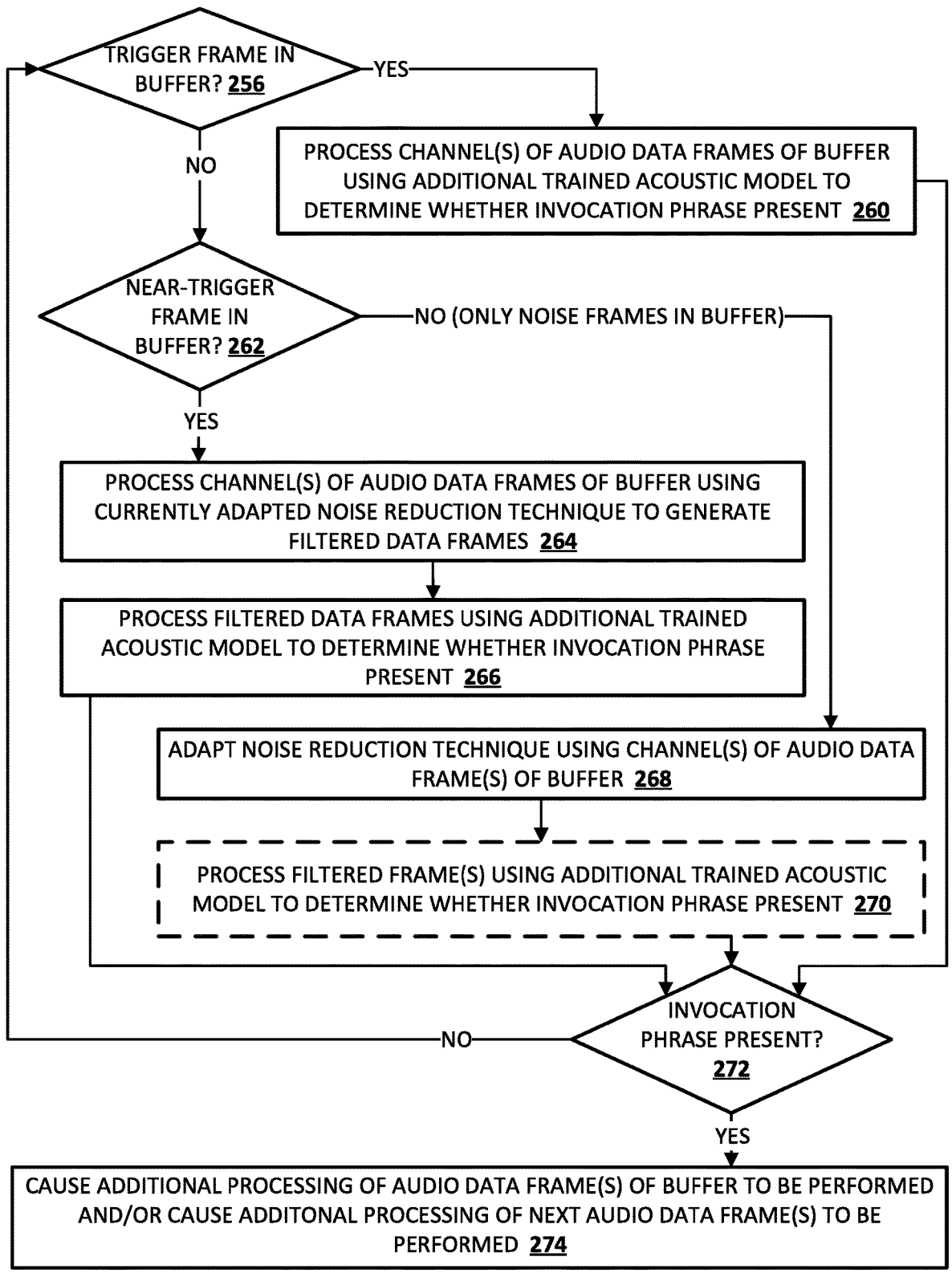

Turning now to FIGS. 2A and 2B, additional description is provided of an example method 200 that can be implemented by the invocation engine 124 of the client device 106. For convenience, the operations of the flow chart are described with reference to a system that performs the operations. This system may include various components of various computer systems, such as one or more processors of the client device 106 and/or one or more modules of the invocation engine 124 of FIG. 1. Moreover, while operations of method 200 are shown in a particular order, this is not meant to be limiting. One or more operations may be reordered, omitted or added.

Blocks 252 and 254 of method 200 are illustrated in FIG. 2A. In some implementations, the classification module 125 performs the blocks of FIG. 2A. At block 252, the system processes one or more channels of a received audio data frame, using a trained acoustic model, to generate output indicative of a classification of the audio data frame. For example, the output can be indicative of whether the audio data frame includes a "trigger", a "near trigger", or "noise".

At block 254, the system stores the received audio data frame and the classification in a buffer, such as a first in, first out buffer in memory accessible to the system. The system then proceeds back to block 252, processes another audio data frame, and stores the audio data frame and its classification in the buffer. Blocks 252 and 254 can be continuously performed on a stream of audio data frames. For example, blocks 252 and 254 can be performed when an automated assistant client of a client computing device is monitoring for a spoken invocation phrase. It can be temporarily halted in response to a user manually setting (e.g., via a hardware switch) the automated assistant client to an inactive mode in which monitoring for a spoken invocation phrase does not occur and/or can be temporarily halted while the automated assistant is invoked (e.g., in response to a prior detected invocation phrase).

Additional blocks of method 200 are illustrated in FIG. 2B. In various implementations, the blocks of FIG. 2B can be performed at a different interval and/or via a different thread than those of FIG. 2A. For example, an iteration of the blocks of FIG. 2B can be iteratively performed, and at each iteration multiple iterations of the blocks of FIG. 2A may have already been performed. In other words, the blocks of FIG. 2A can be performed iteratively to continuously update the contents of the buffer, and the blocks of FIG. 2B performed iteratively (but less frequently than those of FIG. 2A) to periodically assess the current contents of the buffer, and perform further action(s) in dependence on the current contents.

At block 256 of FIG. 2B, the system determines whether there is at least one audio data frame in the buffer that has an output indication indicating it is a "trigger" frame. If so, the system proceeds to block 260 and processes one or more channels of audio data frames of the buffer using an additional trained acoustic model to determine whether an invocation phrase is present in the audio data frames of the buffer. For example, at block 260 the system can flush all audio data frames of the buffer, process at least one channel (and optionally only one channel) of those audio data frames using the additional trained acoustic model, and determine whether there is an invocation phrase present based on outputs generated based on the processing. Following block 260, the system proceeds to block 272, where the system then proceeds to block 274 if it is determined at block 260 that an invocation phrase is present, or proceeds back to block 256 if it is determined that an invocation phrase is not present.

If, at an iteration of block 256 of FIG. 2B, the system determines there is not at least one audio data frame in the buffer that has an output indication indicating it is a "trigger" frame, the system proceeds to block 262 and determines whether there is at least one audio data frame in the buffer that has an output indication indicating it is a "near-trigger" frame. If so, the system proceeds to block 264 and processes one or more channels of one or more audio data frames of the buffer using a currently adapted noise reduction technique to generate filtered data frames. For example, at block 264 the system can flush all audio data frames of the buffer, and process multiple channels of each of the audio data frames using the currently adapted noise reduction technique to generate corresponding filtered data frames (e.g., that include only a single filtered channel). As described in more detail below, the currently adapted noise reduction technique will be the noise reduction technique, as most recently adapted at a most recent iteration of block 268. The system then proceeds to block 266 and processes the filtered data frames (generated at block 264) using a trained acoustic model to determine whether an invocation phrase is present. Block 266 can share one or more aspects in common with block 260, except that filtered data frames are processed. Following block 266, the system proceeds to block 272, where the system then proceeds to block 274 if it is determined at block 260 that an invocation phrase is present, or proceeds back to block 256 if it is determined that an invocation phrase is not present.

If, at an iteration of block 262 of FIG. 2B, the system determines there is not at least one audio data frame in the buffer that has an output indication indicating it is a "near-trigger" frame, the system proceeds to block 268. It is noted that in proceeding to block 268, the system has effectively determined the buffer includes only audio data frames that all have an output indication indicating "noise". In other words, the audio data frames of the buffer are effectively considered "noise" frames as the determinations at blocks 256 and 262 indicate that none of the frames are "trigger" or "near-trigger" frames.

At block 268, the system adapts a noise reduction technique using one or more channels of one or more audio data frames of the buffer. For example, the system can "pop", from the buffer, at least one (and optionally only one) audio data frame that includes at least a first channel (based on a first microphone) and a second channel (based on a second microphone) and utilize the audio data frame to adapt an adaptive noise cancellation filter utilized in an ANC noise reduction technique. The system can then optionally proceed to block 270 and processes filtered data frames (generated at block 268 during the adaptation) using a trained acoustic model to determine whether an invocation phrase is present. In some implementations, at block 270 the system can initially process only the noise reduced frame(s) from block 268. If it is determined based on the processing that the noise reduced frame(s) lack at least a threshold probability of any trigger phoneme, the processing can end. However, in some of those implementations if it is determined that the noise reduced frame(s) included at least a threshold probability for at least one trigger phoneme, additional audio data frame(s) can be pulled from the buffer, processed using the noise reduction technique to generate filtered data frames, and those filtered data frames also processed at bock 270 in determining whether an invocation phrase is present. Following block 270, the system proceeds to block 272, where the system then proceeds to block 274 if it is determined at block 260 that an invocation phrase is present, or proceeds back to block 256 if it is determined that an invocation phrase is not present.

If, at an iteration of block 272, the system proceeds to block 274, the system, at block 274, causes additional processing of audio data frames of the buffer (and/or filtered versions thereof) to be performed and/or causes additional processing of next audio data frame(s) (and/or filtered versions thereof) to be performed. For example, the system can provide the audio data frames of the buffer (e.g., those used in determining the invocation phrase was present), and/or next audio data frames that immediately follow such audio data frames, to one or more remote and/or local automated assistant engines that were not, theretofore, processing audio data frames from the stream.

In some implementations, controller module 126 can perform blocks 256 and 262 of FIG. 2B; NR adaptation module 127 can perform block 268 of FIG. 2B; NR module 129 can perform block 264 of FIG. 2B; and/or invocation phrase module 128 can perform blocks 260, 266, 270, and 274 of FIG. 2B.

Figure 3:
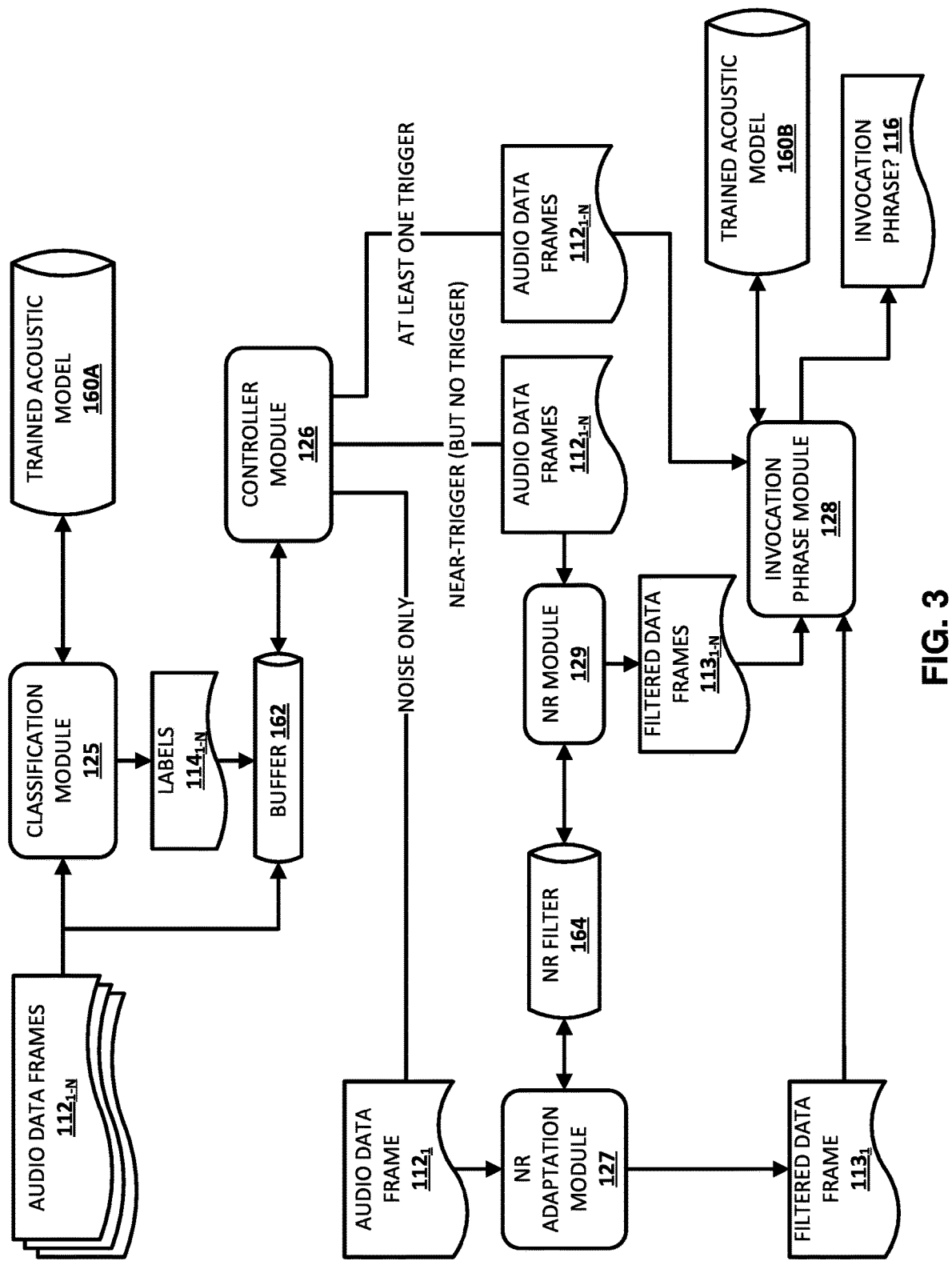
FIG. 3 demonstrates an example of how audio data frames can be processed according to various implementations disclosed herein.

Turning now to FIG. 3, an example is provided of how audio data frames can be processed according to various implementations disclosed herein. In FIG. 3, audio data frames $112_{1-N}$, of a stream of audio data frames, are sequentially provided to classification module 125. The classification module 125 sequentially processes each of the audio data frames $112_{1-N}$ using the trained acoustic model 160A to generate corresponding labels $114_{1-N}$, such as labels that indicate "trigger", "near-trigger", or "noise".

The audio data frames $112_{1-N}$ are stored in the buffer 162, along with their corresponding labels $114_{1-N}$. The controller module 126 accesses the buffer 162 and determines, based on contents of the buffer 162, whether to provide an audio data frame $112_1$ of the buffer 162 to NR adaptation module 127, to provide all audio data frames $112_{1-N}$ of the buffer 162 to the NR module 129, or to provide all audio data frames $112_{1-N}$ of the buffer 162 to the invocation phrase module 128. As indicated in FIG. 3, the controller module 126 can provide an audio data frame $112_1$ of the buffer 162 to NR adaptation module 127 when it determines the buffer 162 includes only "noise" frames, can provide all audio data frames $112_{1-N}$ of the buffer 162 to the NR module 129 when it determines the buffer 162 includes "near-trigger" frame(s) (and optionally that it lacks any "trigger" frames), and can provide all audio data frames $112_{1-N}$ of the buffer 162 to the invocation phrase module 128 when it determines the buffer 162 includes "trigger" frame(s) (and optionally that it lacks any "near-trigger" frames).

Accordingly, in FIG. 3 the controller module 126 makes one of three decisions based on the contents of the buffer 162. It is understood that the example of FIG. 3 is an example at one instance, and that the controller module 126 will make one of three decisions at each of a plurality of additional instances based on the contents of the buffer 162 at the respective instances (as new audio data frames are added to the buffer 162 along with labels provided by classification module 125).

When the controller module 126 provides an audio data frame $112_1$ of the buffer 162 to NR adaptation module 127, the NR adaptation module 127 adapts the NR filter 164 based on the audio data frame $112_1$. The NR adaptation module 127 also optionally provides a filtered data frame $113_1$, that is a filtered version of the audio data frame $112_1$ generated during the adaptation, to invocation phrase module 128. The invocation phrase module 128 can process the filtered data frame $113_1$ using the trained acoustic model 160B in determining whether an invocation phrase is present 116.

When the controller module 126 provides all audio data frames $112_{1-N}$ of the buffer 162 to the NR module 129, the NR module 129 processes those audio data frames $112_{1-N}$ using the NR filter 164 (as most recently adapted by the NR adaptation module 127 in a prior instance) to generate filtered data frames $113_{1-N}$. The NR module 129 provides the filtered data frames $113_{1-N}$ to the invocation phrase module 128, which processes those frames using the trained acoustic model 160B in determining whether an invocation phrase is present 116.

When the controller module 126 provides all audio data frames $112_{1-N}$ of the buffer 162 to the invocation phrase module 128, it processes those frames (optionally only a single channel thereof) using the trained acoustic model 160B in determining whether an invocation phrase is present 116.

Figure 4:
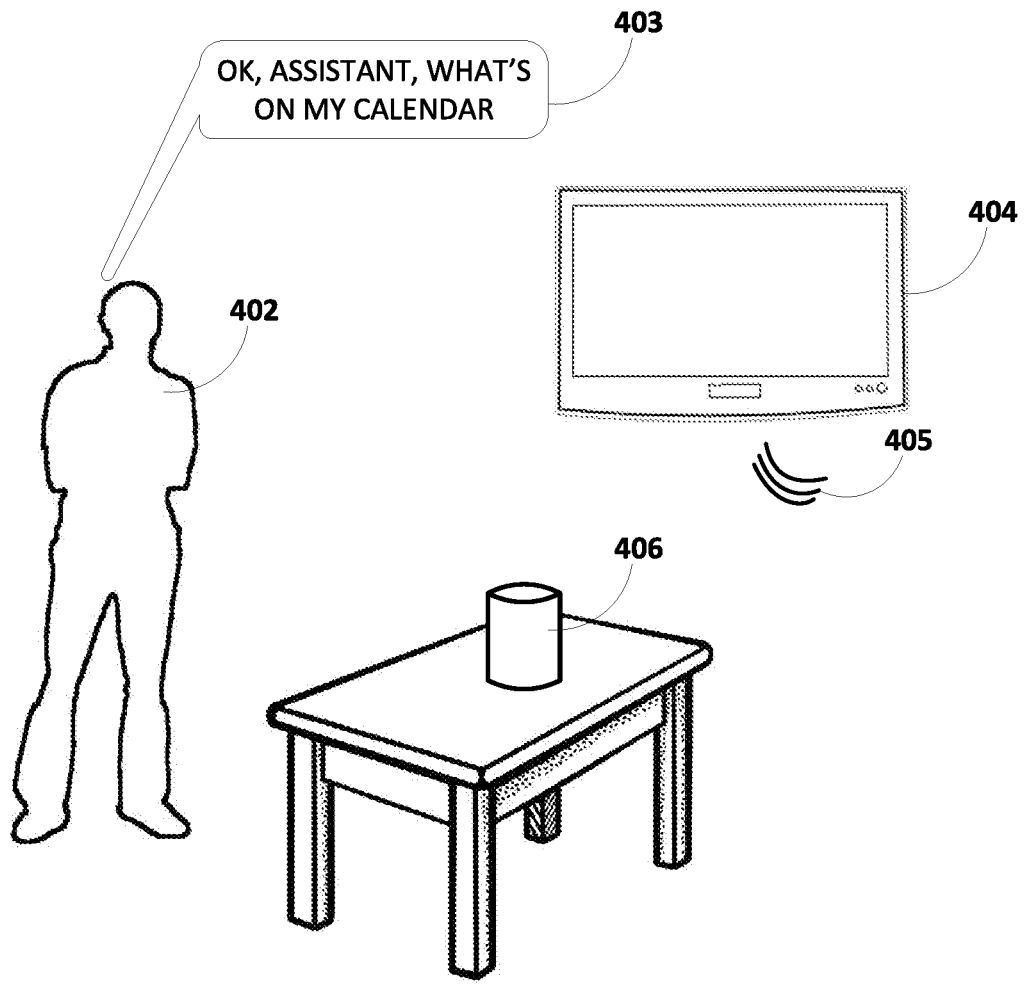
FIG. 4 illustrates an example client device, example user, and example background noise source.

FIG. 4 illustrates an example client device 406 that, in the example of FIG. 4, takes the form of a standalone interactive speaker with a microphone (not specifically depicted). FIG. 4 also illustrates an example user 402 speaking a spoken utterance 403 of "OK, Assistant, what's on my calendar". Further, FIG. 4 includes a television 404 that is providing background noise 405. "OK, Assistant" can be an invocation phrase for an automated assistant, implemented at least in part on client device 406 (e.g., via an automated assistant client). One or more processors of the client device 406 can utilize techniques described herein to detect the invocation phrase in the spoken utterance 403 even in the presence of background noise, such as background noise 405 from the television 404. For example, various techniques can utilize a noise reduction technique that has been adapted in view of previous "noise" audio data frames, thereby effectively adapting the noise reduction technique to reduce the background noise 405. As also described herein, detection of the invocation phrase can invoke the automated assistant, thereby causing further processing of "what's on my calendar" to be performed, an appropriate response generated by the automated assistant, and the response audibly rendered via speaker(s) of the client device 406. For instance, the response can be a summary of the user's stored calendar entries for the current day.

Figure 5:
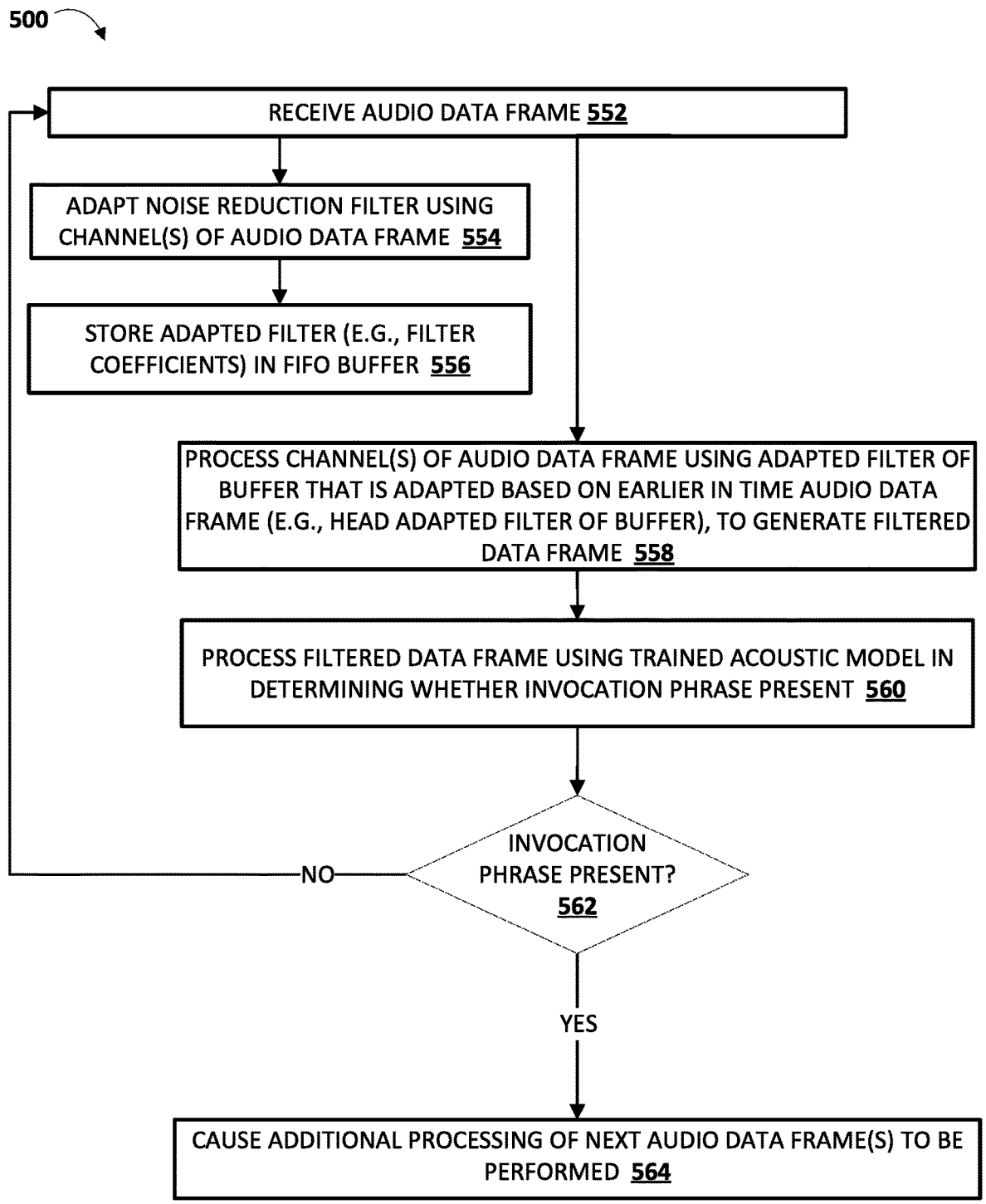
FIG. 5 depicts a flowchart illustrating another example method according to various implementations disclose herein.

Turning now to FIG. 5, additional description is provided of another example method 500 that can be implemented by the invocation engine 124 of the client device 106. Method 500 can be implemented by the invocation engine 124 in lieu of the method 200 of FIGS. 2A and 2B (or similar method)—or could optionally even be implemented in parallel with method 200 (and both methods utilized in determining when an invocation phrase is present).

For convenience, the operations of the flow chart of FIG. 5 are described with reference to a system that performs the operations. This system may include various components of various computer systems, such as one or more processors of the client device 106 and/or one or more modules of the invocation engine 124 of FIG. 1. Moreover, while operations of method 500 are shown in a particular order, this is not meant to be limiting. One or more operations may be reordered, omitted or added.

At block 554, the system receives an audio data frame, of a stream of audio data frames. The system then proceeds to both block 554, and to block 558. The system can proceed to blocks 554 and 558 in parallel (e.g., via different threads).

At block 554, the system adapts a noise reduction filter using one or more channels of the audio data frame received at block 552. For example, the system can adapt an ANC filter used in an ANC noise reduction techniques, such as one that utilizes STFT based RLS as described above.

From block 554, the system proceeds to block 556 and stores the adapted filter, as adapted at the most recent iteration of block 554, in a first in, first out (FIFO) buffer in memory accessible to the system. For example, the system can store the adapted filter by storing the coefficients of the adapted filter as adapted at the most recent iteration of block 554. Accordingly, in distinction to method 200 (which stores audio data frames in the buffer), in method 500 adapted filters are stored in the buffer.

At block 558, the system processes one or more channels of the received audio data frame using an adapted filter of the FIFO buffer, where the adapted filter is one that is adapted based on an earlier in time audio data frame. For example, the adapted filter can be the adapted filter at the "head" of the FIFO buffer (e.g., the "oldest" adapted filter of the FIFO buffer), where the adapted filter at the head of the FIFO buffer was adapted at an earlier in time iteration of block 554 based on an earlier in time audio data frame, of the stream of audio data frames, received at an earlier iteration of block 552. The system processes the channel(s) using the adapted filter to generate a filtered data frame. Accordingly, at block 558 the system processes the received audio data frame using an adapted filter that is adapted based on an earlier in time audio data frame (and in view of audio data frames that preceded that audio data frame). For instance, the FIFO buffer can hold a quantity of adapted filters, from corresponding audio data frames, where the corresponding audio data frames constitute 1 to 2 seconds (or other value) of the audio data stream. Further, the audio data filter used in block 558 can be from the head of the FIFO buffer, thereby generating the filtered data frame in view of an adapted filter that was adapted based on an audio data frame from 1 to 2 seconds (or other value) ago—but not adapted on any more recent in time audio data frames. Accordingly, the adapted filter used at block 558 is "deferred" (relative to its generation and its corresponding audio data frame) in its application, thereby generating a filtered audio data frame that has reduced background noise, while mitigating the risk of reducing any potentially present trigger phoneme(s) (or other target feature(s) in other implementations) in the filtered audio data frame.

From block 558, the system proceeds to block 560 and processes the filtered data frame using a trained acoustic model in determining whether an invocation phrase is present. The system then proceeds to block 560 and determines whether an invocation phrase is present, which can be based on the most recent iteration of block 560, and one or more preceding iterations of block 560. For example, it can be based on determining a trigger phoneme is present based on the processing of the most recent iteration of block 560, and based on determining another trigger phoneme is present based on the processing of a preceding iteration of block 560. The system proceeds to block 564 if it is determined at block 562 that an invocation phrase is present, or proceeds back to block 552 if it is determined that an invocation phrase is not present.

If, at an iteration of block 562, the system proceeds to block 564, the system, at block 564, causes additional processing of next audio data frame(s) (and/or filtered versions thereof) to be performed. For example, the system can provide the next audio data frames to one or more remote and/or local automated assistant engines that were not, theretofore, processing audio data frames from the stream.

If, at an iteration of block 562, the system proceeds to block 552, the system receives a next audio data frame at block 552 and proceeds to blocks 554 and 558 on the basis of the next audio data frame. Accordingly, through multiple iterations of method 500, a stream of audio data frames is processed and monitored for the presence of an invocation phrase—while using adapted filters, that are deferred in their application, to filter current audio data frames before processing over an acoustic model in determining whether invocation phoneme(s) are present. It is noted that in performing method 500 only a single acoustic model can be utilized and that controller module 126 can be omitted.

Although method 500 is described with respect to detecting presence of an invocation phrase, it can additionally or alternatively be utilized to detect presence of alternative features, such as voice features for speaker identification. In some implementations, NR adaptation module 127 can perform blocks 554 and 556 of FIG. 5; NR module 129 can perform block 558 of FIG. 5; and/or invocation phrase module 128 can perform blocks 560, 562, and 564 of FIG. 2B.

Figure 6:
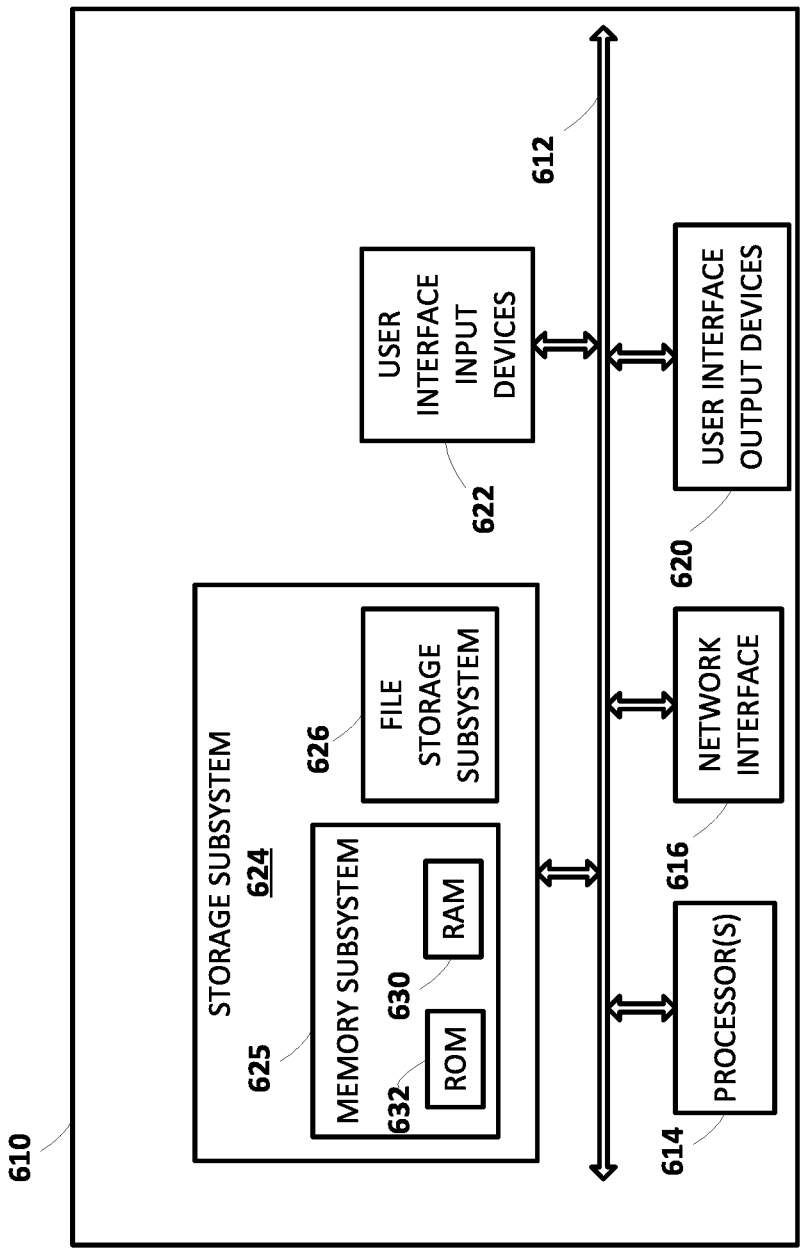
FIG. 6 illustrates an example architecture of a computing device.

FIG. 6 is a block diagram of an example computing device 610 that may optionally be utilized to perform one or more aspects of techniques described herein. Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the method of FIGS. 2A and 2B, the method of FIG. 5, and/or to implement various components depicted in FIG. 1.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

In situations in which certain implementations discussed herein may collect or use personal information about users (e.g., user data extracted from other electronic communications, information about a user's social network, a user's location, a user's time, a user's biometric information, and a user's activities and demographic information, relationships between users, etc.), users are provided with one or more opportunities to control whether information is collected, whether the personal information is stored, whether the personal information is used, and how the information is collected about the user, stored and used. That is, the systems and methods discussed herein collect, store and/or use user personal information only upon receiving explicit authorization from the relevant users to do so.

For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

In some implementations, a method of detecting an invocation phrase for an automated assistant is implemented by one or more processors of a client device and includes: receiving a stream of audio data frames that are based on output from one or more microphones of the client device; and processing each of the audio data frames of the stream using a trained machine learning model to generate respective output indicating one or more corresponding probabilities of the presence of one or more corresponding invocation phonemes. The method further includes storing the audio data frames of the stream in a buffer, along with output indications for the audio data frames. Each of the output indications is for a respective one of the audio data frames and is based on the corresponding output generated based on processing of the respective one of the audio data frames using the trained machine learning model. The method further includes determining, at a first instance, that the output indications in the buffer at the first instance indicate that the audio data frames in the buffer at the first instance all fail to include any of the one or more corresponding invocation phonemes. The method further includes, in response to the determination at the first instance: using at least one of the audio data frames in the buffer at the first instance to adapt a noise reduction filter. The method further includes determining, at a second instance after the first instance, that the output indications in the buffer at the second instance indicate that at least one of the audio data frames in the buffer at the second instance potentially includes at least one of the one or more corresponding invocation phonemes. The method further includes, in response to the determination at the second instance: generating filtered data frames based on processing of a plurality of the audio data frames in the buffer at the second instance using the noise reduction filter as adapted at least in part in response to the determination at the first instance; and determining whether the filtered data frames indicate presence of the invocation phrase based on processing the filtered data frames using the trained machine learning model, or an additional trained machine learning model. The method further includes, in response to determining that the filtered data frames indicate presence of the invocation phrase: causing at least one function of the automated assistant to be activated.

These and other implementations of the technology disclosed herein can include one or more of the following features.

In some implementations, causing the at least one function of the automated assistant to be activated includes causing subsequently received audio data frames of the stream to be transmitted to one or more remote automated assistant servers for further processing. The further processing can include, for example, one or more of speech-to-text conversion, semantic processing, and dialog state tracking.

In some implementations, using the at least one of the audio data frames in the buffer at the first instance to adapt the noise reduction filter includes removing a single data frame from the buffer and using the single data frame to adapt the noise reduction filter.

In some implementations, the audio data frames of the stream include at least a first channel based on a first microphone of the one or more microphones and a second channel based on a second microphone of the one or more microphones. In some of those implementations, processing each of the audio data frames of the stream using the trained acoustic model to generate the respective output includes processing only the first channel of each of the audio data frames using the trained acoustic model. In some of those implementations, the noise reduction filter is a multichannel noise reduction filter, and using at least one of the audio data frames in the buffer at the first instance to adapt the noise reduction filter includes using both the first channel and the second channel of at least one of the audio data frames in the buffer at the first instance to adapt the noise reduction filter. Using both the first channel and the second channel of at least one of the audio data frames in the buffer at the first instance to adapt the noise reduction filter can include, for example, using the first channel as a signal source and the second channel as a noise source in determining an error for updating the noise reduction filter. Generating filtered data frames based on processing of the plurality of the audio data frames in the buffer at the second instance using the noise reduction filter as adapted at least in part in response to the determination at the first instance, can include: using both the first channel and the second channel of the plurality of the audio data frames in generating the filtered data frames.

In some implementations, the output indications in the buffer at the second instance indicate that at least one of the audio data frames in the buffer at the second instance potentially includes at least one of the one or more corresponding invocation phonemes, based on the corresponding output satisfying a first threshold, but failing to satisfy a second threshold.

In some implementations, a method implemented by one or more processors of a client device is provided and includes, while one or more functions of automated assistant client of the client device are inactive: accessing a buffer that includes a plurality of most recently processed audio data frames and a plurality of output indications that each correspond to a respective one of the audio data frames. The audio data frames are based on output from one or more microphones of the client device. The output indications are each determined based on processing of a respective one of the audio data frames using a machine learning model, and each indicate whether the respective one of the audio data frames is: a noise frame that fails to satisfy a first threshold, a near-trigger frame that satisfies the first threshold but fails to satisfy a second threshold, or a trigger frame that satisfies both the first threshold and the second threshold. The method further includes, when the output indications of the buffer indicate that all of the data frames of the buffer are the noise frames: using at least one of the audio data frames in the buffer to adapt a noise reduction filter. The method further includes, when the output indications of the buffer indicate that the data frames of the buffer include at least one near-trigger frame, but no trigger frames: generating filtered data frames based on processing of a plurality of the audio data frames in the buffer using the noise reduction filter; and processing the filtered data frames using the trained machine learning model, or an additional trained machine learning model, to determine whether the filtered data frames indicate presence of an invocation phrase. The method further includes activating one or more of the functions of the automated assistant when the filtered data frames indicate presence of the invocation phrase.

These and other implementations of the technology disclosed herein can include one or more of the following features.

In some implementations, the method further includes, when the output indications of the buffer indicate that the data frames of the buffer include at least one trigger frame: processing a plurality of the audio data frames in the buffer using the trained acoustic model, or the additional trained acoustic model, to determine whether the audio data frames indicate presence of an invocation phrase; and activating one or more of the functions of the automated assistant when the audio data frames indicate presence of the invocation phrase.

In some implementations, generating the filtered data frames based on processing of a plurality of the audio data frames in the buffer using the noise reduction filter includes removing all of the audio data frames from the buffer and generating the filtered data frames based on processing of all of the audio data frames. In some of those implementations, processing a plurality of the audio data frames in the buffer using the trained machine learning model, or the additional trained machine learning model, to determine whether the audio data frames indicate presence of an invocation phrase includes removing all of the audio data frames from the buffer and processing of all of the audio data frames using the trained machine learning model, or the additional trained machine learning model, to determine whether the audio data frames indicate presence of the invocation phrase.

In some implementations, a method of detecting an invocation phrase for an automated assistant is implemented by one or more processors of a client device and includes: receiving a group of audio data frames that are based on output from one or more microphones of the client device; and processing each of the audio data frames of the group using a trained machine learning model to generate respective output indicating one or more corresponding probabilities of the presence of one or more corresponding invocation phonemes. The method further includes, in response to at least one of the corresponding probabilities satisfying a first threshold, but failing to satisfy a second threshold: generating filtered data frames based on processing of the audio data frames of the group using a noise reduction filter; determining whether the filtered data frames indicate presence of the invocation phrase based on processing the filtered data frames using the trained machine learning model, or an additional trained machine learning model; and in response to determining that the filtered data frames indicate presence of the invocation phrase: causing at least one function of the automated assistant to be activated.

These and other implementations of the technology disclosed herein can include one or more of the following features.

In some implementations, the method further includes, prior to generating the filtered data frames using the noise reduction filter: adapting the noise reduction filter based on at least one audio data frame of a preceding group of audio data frames that preceded the group of audio data frames. In some of those implementations, the method further includes processing each of the audio data frames of the preceding group using the trained machine learning model to generate respective output indicating one or more corresponding preceding probabilities of the presence of one or more corresponding invocation phonemes. In some versions of those implementations, adapting the noise reduction filter based on the at least one audio data frame of the preceding group of audio data frames is in response to determining that none of the corresponding preceding probabilities satisfy the first threshold or the second threshold.

In some implementations, the method further includes, prior to generating the filtered data frames using the noise reduction filter: adapting the noise reduction filter based on a preceding audio data frame, that preceded the group of audio data frames. In some of those implementations, adapting the noise reduction filter based on the preceding audio data frame is based on: processing the preceding audio data frame using the trained machine learning model to generate preceding output that indicates one or more preceding probabilities of the presence of one or more invocation phonemes, and determining that none of the preceding probabilities satisfies the first threshold or the second threshold.

In some implementations, the at least one function of the automated assistant that is activated includes local or remote: speech-to-text processing, semantic processing, and/or dialog state tracking.

In some implementations, a method of detecting a feature in a spoken utterance directed to an automated assistant is implemented by one or more processors and includes: receiving a stream of audio data frames that are based on output from one or more microphones of a client device; processing each of the audio data frames of the stream using a trained machine learning model to generate respective output indicating one or more corresponding probabilities of the presence of one or more corresponding features; and storing the audio data frames of the stream in a buffer, along with output indications for the audio data frames. Each of the output indications is for a respective one of the audio data frames and is based on the corresponding output generated based on processing of the respective one of the audio data frames using the trained machine learning model. The method further includes determining, at a first instance, that the output indications in the buffer at the first instance indicate that the audio data frames in the buffer at the first instance all fail to include any of the one or more corresponding features. The method further includes, in response to the determination at the first instance: using at least one of the audio data frames in the buffer at the first instance to adapt a noise reduction filter. The method further includes determining, at a second instance after the first instance, that the output indications in the buffer at the second instance indicate that at least one of the audio data frames in the buffer at the second instance potentially includes at least one of the one or more corresponding features. The method further includes, in response to the determination at the second instance: generating filtered data frames based on processing of a plurality of the audio data frames in the buffer at the second instance using the noise reduction filter as adapted at least in part in response to the determination at the first instance; determining whether the filtered data frames indicate presence of the features based on processing the filtered data frames using the trained machine learning model, or an additional trained machine learning model; and adapting processing performed by the automated assistant in response to determining that the filtered data frames indicate presence of the features.

These and other implementations of the technology disclosed herein can include one or more of the following features.

In some implementations, the features include voice characteristics stored in association with a profile. In some of those implementations, adapting processing performed by the automated assistant includes generating, based on the profile, content to be rendered by the automated assistant, where the content is generated based on the profile in response to the filtered data frames indicating presence of the features, and the features being stored in association with the profile.

In some implementations, adapting processing performed by the automated assistant additionally or alternatively includes causing at least one inactive function of the automated assistant to be activated. The one inactive function can be, for example, natural language processing or dialog state tracking.

In some implementations, a method of detecting at least one feature present in a spoken utterance directed to an automated assistant is provided and includes: receiving a group of audio data frames that are based on output from one or more microphones of a client device; and processing each of the audio data frames of the group using a trained machine learning model to generate respective output indicating one or more corresponding probabilities of the presence of the at least one feature. The method further includes, in response to at least one of the corresponding probabilities satisfying a first threshold, but failing to satisfy a second threshold: generating filtered data frames based on processing of the audio data frames of the group using a noise reduction filter; and determining whether the filtered data frames indicate presence of the at least one feature based on processing the filtered data frames using the trained machine learning model, or an additional trained machine learning model. The method further includes, in response to determining that the filtered data frames indicate presence of the at least one feature: adapting processing performed by the automated assistant.

In some implementations, a method of detecting an invocation phrase for an automated assistant is implemented by one or more processors of a client device and includes: receiving a stream of audio data frames that are based on output from one or more microphones of the client device; processing each of the audio data frames of the stream using a trained machine learning model to generate respective output indicating one or more corresponding probabilities of the presence of one or more corresponding invocation phonemes; determining, at a first instance, that the respective output, generated for a given audio data frame of the audio data frames, indicates that the given audio data frame fails to include any of the one or more corresponding invocation phonemes; in response to the determination at the first instance: using the given audio data frame to adapt a noise reduction filter; determining, at a second instance after the first instance, that at least one of one or more of the audio data frames received after the given audio data frame potentially includes at least one of the one or more corresponding invocation phonemes; in response to the determination at the second instance: generating filtered data frames based on processing of the one or more of the audio data frames using the noise reduction filter as adapted at least in part in response to the determination at the first instance; and determining whether the filtered data frames indicate presence of the invocation phrase based on processing the filtered data frames using the trained machine learning model, or an additional trained machine learning model; and in response to determining that the filtered data frames indicate presence of the invocation phrase: causing at least one function of the automated assistant to be activated.

In some implementations, a method of detecting an invocation phrase for an automated assistant is implemented by one or more processors of a client device and includes, for each audio data frame of a first set of sequential audio data frames of a stream of audio data frames that are based on output from one or more microphones of the client device: generating a corresponding noise reduction filter based on the audio data frame, and storing the corresponding noise reduction filter in a first in, first out buffer. The method further includes, for a given audio data frame, of the stream of audio data frames, that immediately follows the first set of sequential audio data frames: generating a filtered data frame based on processing the given audio frame using the corresponding noise reduction filter that is at a head of the first in, first out buffer, and determining whether the filtered data frame indicates presence of one or more phonemes of the invocation phrase based on processing the filtered data frame using a trained machine learning model. The method further includes determining whether an invocation phrase is present in the stream of audio data frames based on whether the filtered data frame indicates presence of one or more of the phonemes of the invocation phrase.

What is claimed is:

1. A method implemented by one or more processors of a client device, comprising:
while one or more functions of an automated assistant client of the client device are inactive:
accessing a buffer that includes a plurality of most recently processed audio data frames and a plurality of output indications that each correspond to a respective one of the audio data frames,
wherein the audio data frames are based on output from one or more microphones of the client device, and
wherein the output indications are each determined based on processing of a respective one of the audio data frames using a machine learning model, and each indicate whether the respective one of the audio data frames is: a noise frame that fails to satisfy a first threshold, a near-trigger frame that satisfies the first threshold but fails to satisfy a second threshold, or a trigger frame that satisfies both the first threshold and the second threshold;
when the output indications of the buffer indicate that all of the data frames of the buffer are the noise frames:
using at least one of the audio data frames in the buffer to adapt a noise reduction filter;
when the output indications of the buffer indicate that the data frames of the buffer include at least one near-trigger frame, but no trigger frames:
generating filtered data frames based on processing of a plurality of the audio data frames in the buffer using the noise reduction filter;

processing the filtered data frames using the trained machine learning model, or an additional trained machine learning model, to determine whether the filtered data frames indicate presence of an invocation phrase; and activating one or more of the functions of the automated assistant when the filtered data frames indicate presence of the invocation phrase.

2. The method of claim 1, further comprising:
when the output indications of the buffer indicate that the data frames of the buffer include at least one trigger frame:
processing a plurality of the audio data frames in the buffer using the trained machine learning model, or the additional trained machine learning model, to determine whether the audio data frames indicate presence of an invocation phrase; and
activating one or more of the functions of the automated assistant when the audio data frames indicate presence of the invocation phrase.

3. The method of claim 1, wherein generating the filtered data frames based on processing of a plurality of the audio data frames in the buffer using the noise reduction filter comprises removing all of the audio data frames from the buffer and generating the filtered data frames based on processing of all of the audio data frames.

4. The method of claim 3, wherein processing a plurality of the audio data frames in the buffer using the trained machine learning model, or the additional trained machine learning model, to determine whether the audio data frames indicate presence of the invocation phrase comprises removing all of the audio data frames from the buffer and processing of all of the audio data frames using the trained machine learning model, or the additional trained machine learning model, to determine whether the audio data frames indicate presence of the invocation phrase.

5. A method of detecting an invocation phrase for an automated assistant, the method implemented by one or more processors of a client device and comprising:
receiving a group of audio data frames that are based on output from one or more microphones of the client device;
processing each of the audio data frames of the group using a trained machine learning model to generate respective output indicating one or more corresponding probabilities of the presence of one or more corresponding invocation phonemes;
in response to at least one of the corresponding probabilities, of the presence of the one or more corresponding invocation phonemes, satisfying a first threshold, but failing to satisfy a second threshold:
generating filtered data frames based on processing of the audio data frames of the group using a noise reduction filter; and
determining whether the filtered data frames indicate presence of the invocation phrase based on processing the filtered data frames using the trained machine learning model, or an additional trained machine learning model; and
in response to determining that the filtered data frames indicate presence of the invocation phrase:
causing at least one function of the automated assistant to be activated.

6. The method of claim 5, further comprising:
prior to generating the filtered data frames using the noise reduction filter:
adapting the noise reduction filter based on at least one audio data frame of a preceding group of audio data frames that preceded the group of audio data frames.

7. The method of claim 6, further comprising:
processing each of the audio data frames of the preceding group using the trained machine learning model to generate respective output indicating one or more corresponding preceding probabilities of the presence of one or more corresponding invocation phonemes;
wherein adapting the noise reduction filter based on the at least one audio data frame of the preceding group of audio data frames is in response to determining that none of the corresponding preceding probabilities satisfy the first threshold or the second threshold.

8. The method of claim 5, further comprising:
prior to generating the filtered data frames using the noise reduction filter:
adapting the noise reduction filter based on a preceding audio data frame, that preceded the group of audio data frames.

9. The method of claim 8, wherein adapting the noise reduction filter based on the preceding audio data frame is based on:
processing the preceding audio data frame using the trained machine learning model to generate preceding output that indicates one or more preceding probabilities of the presence of one or more invocation phonemes, and determining that none of the preceding probabilities satisfies the first threshold or the second threshold.

10. A method of detecting at least one feature present in a spoken utterance directed to an automated assistant, the method comprising:
receiving a group of audio data frames that are based on output from one or more microphones of a client device;
processing each of the audio data frames of the group using a trained machine learning model to generate respective output indicating one or more corresponding probabilities of the presence of the at least one feature;
in response to at least one of the corresponding probabilities, of the presence of the at least one feature, satisfying a first threshold, but failing to satisfy a second threshold:
generating filtered data frames based on processing of the audio data frames of the group using a noise reduction filter; and
determining whether the filtered data frames indicate presence of the at least one feature based on processing the filtered data frames using the trained machine learning model, or an additional trained machine learning model; and
in response to determining that the filtered data frames indicate presence of the at least one feature:
adapting processing performed by the automated assistant.

11. The method of claim 10, wherein the features comprise voice characteristics stored in association with a profile.

12. The method of claim 11, wherein adapting processing performed by the automated assistant comprises:
generating, based on the profile, content to be rendered by the automated assistant, wherein the content is generated based on the profile in response to the filtered data frames indicating presence of the features, and the features being stored in association with the profile.

13. The method of claim 10, wherein adapting processing performed by the automated assistant comprises:
 causing at least one inactive function of the automated assistant to be activated.

14. The method of claim 13, wherein the at least one inactive function comprises natural language processing.

15. The method of claim 13, wherein the at least one inactive function comprises dialog state tracking.

\* \* \* \* \*